United States Patent [19]

Hart

[11] 4,371,295

[45] * Feb. 1, 1983

[54] SYSTEM FOR SPRAYING POWDER

[75] Inventor: Robert J. Hart, Tulsa, Okla.

[73] Assignee: Commercial Resins Company, Tulsa, Okla.

[ * ] Notice: The portion of the term of this patent subsequent to Jan. 5, 1999, has been disclaimed.

[21] Appl. No.: 245,454

[22] Filed: Mar. 19, 1981

Related U.S. Application Data

[62] Division of Ser. No. 177,086, Aug. 11, 1980, Pat. No. 4,308,819.

[51] Int. Cl.[3] .............................................. B65G 53/40

[52] U.S. Cl. .................................... 406/128; 406/138; 408/146; 251/144; 251/323

[58] Field of Search ............... 406/138, 128, 130, 146, 406/90; 239/143, 654; 251/144, 321, 318, 323; 222/46, 185, 195, 501, 504, 518

[56] References Cited

U.S. PATENT DOCUMENTS 2,859,765 11/1958 Streed ................................ 251/144
3,403,941 10/1968 Solt ...................................... 406/90
4,237,817 12/1980 Hart et al. ........................... 118/307

*Primary Examiner*—Andres Kashnikow
*Assistant Examiner*—Paul A. Sobel
*Attorney, Agent, or Firm*—William S. Dorman

[57] ABSTRACT

A system for spraying fluidized powder comprising at least one powder dispenser, a powder fluidization chamber containing a quantity of powder therein, a fluidization hose for introducing a stream of air into the chamber to fluidize the powder therein, at least one powder blower having an outlet from which a stream of air is allowed to pass, at least one powder control valve connected to the chamber and in communication with the fluidized powder therein, a rod for actuating each powder control valve wherein a quantity of fluidized powder is exhausted into an orifice in each powder control valve, a powder hose for introducing the fluidized powder from each powder control valve into the sides of each powder blower outlet, a conduit connecting each powder blower outlet with a portion of each powder dispenser for supplying a stream of fluidized powder, and a fluidization blower from which a stream of fluidizing air is allowed to pass into the fluidization hose.

2 Claims, 7 Drawing Figures

SYSTEM FOR SPRAYING POWDER

CROSS-REFERENCE TO RELATED APPLICATION

The present application is a division of my copending application Ser. No. 177,086, filed Aug. 11, 1980, now U.S. Pat. No. 4,308,819, and entitled "System for Spraying Fluidized Powder Circumferentially around a Pipe Joint".

BACKGROUND OF THE INVENTION

1. Field of the Invention

The present invention relates to an improved apparatus for spraying powder. More particularly, this invention relates to improvements in a powder fluidization chamber and in the means for supplying an air powder suspension.

2. Prior Art

In U.S. Pat. No. 4,237,817, there is described a system for spraying or dispensing a powdered material circumferentially around a pipe. The pipe itself is made up from pipe sections which have been previously coated at the mill except for the ends thereof which are left uncoated so that the sections can be welded together in the field in end-to-end relation. The apparatus of the aforementioned U.S. Patent, therefore, deposits powder on the weld joints (which have been previously heated) to complete the coating of the pipe.

However, the use of the Venturis (in the above Patent) to draw the fluidized powder out of the powder suspension device and deliver it to the weld joint requires the use of an air compressor. As well as the problems which accompany moist air from the compressor being in contact with the powder, additional problems due to the rapid wearing of the Venturi components have been encountered.

Even with the use of the Venturis, it is difficult to meter exactly the quantity of powder to be supplied to each weld joint. Obviously, an insufficient quantity of powder will result in a poor coating of the weld. The present invention provides a system which is operator-adjustable thereby allowing a desired metered amount of powder to be delivered rather than relying on the Venturis in which delivery of powder is dependent upon component wear.

SUMMARY OF THE INVENTION

In light of the above, the present invention provides an apparatus for spraying powder which includes an improved fluidization chamber, and an improved means for delivering the fluidized powder from the above chamber to a powder dispenser.

The present invention is disclosed herein (for illustrative purposes) in combination with a powder applicator ring or yoke which is connected by means of conduits or hoses to a fluidization assembly. The fluidization assembly, which is the essence of the present invention, is mounted on a movable metal carriage which has wheels that can be positioned on top of the pipeline and moved along the pipe. The applicator ring, consisting of a metal framework made up from three arcuate sections, is capable of surrounding the area of the weld joint and over the entire circumference of the pipe. The framework is latched at the bottom with an air cylinder which maintains a predetermined latching pressure.

The powder applicator ring includes a pair of powder dispensers mounted approximately 180° apart.

The fluidization assembly includes essentially a fluidization chamber, a powder valve and an actuator assembly. For the purposes of this specific illustration only, the fluidization assembly also includes a powder recovery canister. The fluidization assembly is also provided with three vacuum-type blowers and an air compressor. However, the air supply from the compressor is used to actuate the powder control valves and the latching cylinder on the applicator ring. This moist compressed air does not come in contact with the powder in the fluidization chamber.

The fluidization chamber is a sealed cylinder approximately 18 inches in diameter and is provided with a porous plastic screen near the bottom of the chamber extending throughout its diameter. The screen or sheet divides the chamber into two sections wherein a powder rests on top of the screen and becomes fluidized or aerated by the passage of air through the porous screen. The source of fluidized air is a blower whose exhaust is injected into the bottom of the chamber beneath the screen.

The exhaust air, after bubbling up through the powder and causing it to fluidize, is trapped above the powder in the sealed chamber causing the air to build up a pressure. The pressurized air is metered out of the chamber through fixed orifices, entering into a tubing along the poppet valve end of the powder control valve.

The poppets are unseated by actuating a pneumatic cylinder on the actuator assembly. As the cone-shaped poppets are unseated, the pressure of the air above the fluidized powder forces the powder out of the chamber and through an adjustable orifice between the powder valve bodies and their poppets. The fluidized powder, which is discharged through the powder valve orifices, is injected into an air stream which is subsequently delivered to the powder dispensers on the applicator ring. The source of the air streams is the exhaust from two powder blowers which are mounted opposite each other on the side of the recovery canister.

As an added feature, which forms no part of the present invention, each powder dispenser has an inner housing and an outer housing forming a space therebetween and both dispenser housings have openings positioned adjacent the surface of the pipe. The spaces between the housings on the powder dispensers are connected with a pair of conduits which, in turn, are connected to two tangential inlet pipes on the recovery canister so as to suck up excess powder from the weld joint.

As part of this added feature, the suction ports of the two powder blowers are connected to the inside of the recovery canister, thus drawing down the pressure within the canister below atmospheric. The two tangential inlet pipes enter the recovery canister near the top. The excess powder, which is recovered from the powder dispensers, flows into the inlet pipes effecting a cyclone-type separation of the powder particles from the air stream. The recovered or reclaimed particles are deposited on the bottom of the canister.

The third blower of the fluidization assembly is mounted on the rear of the canister. This third blower is the source of the fluidizing air for the chamber. Unlike the two powder blowers, its suction is from the atmosphere.

DETAILED DESCRIPTION OF THE PREFERRED EMBODIMENTS

Figure 3:
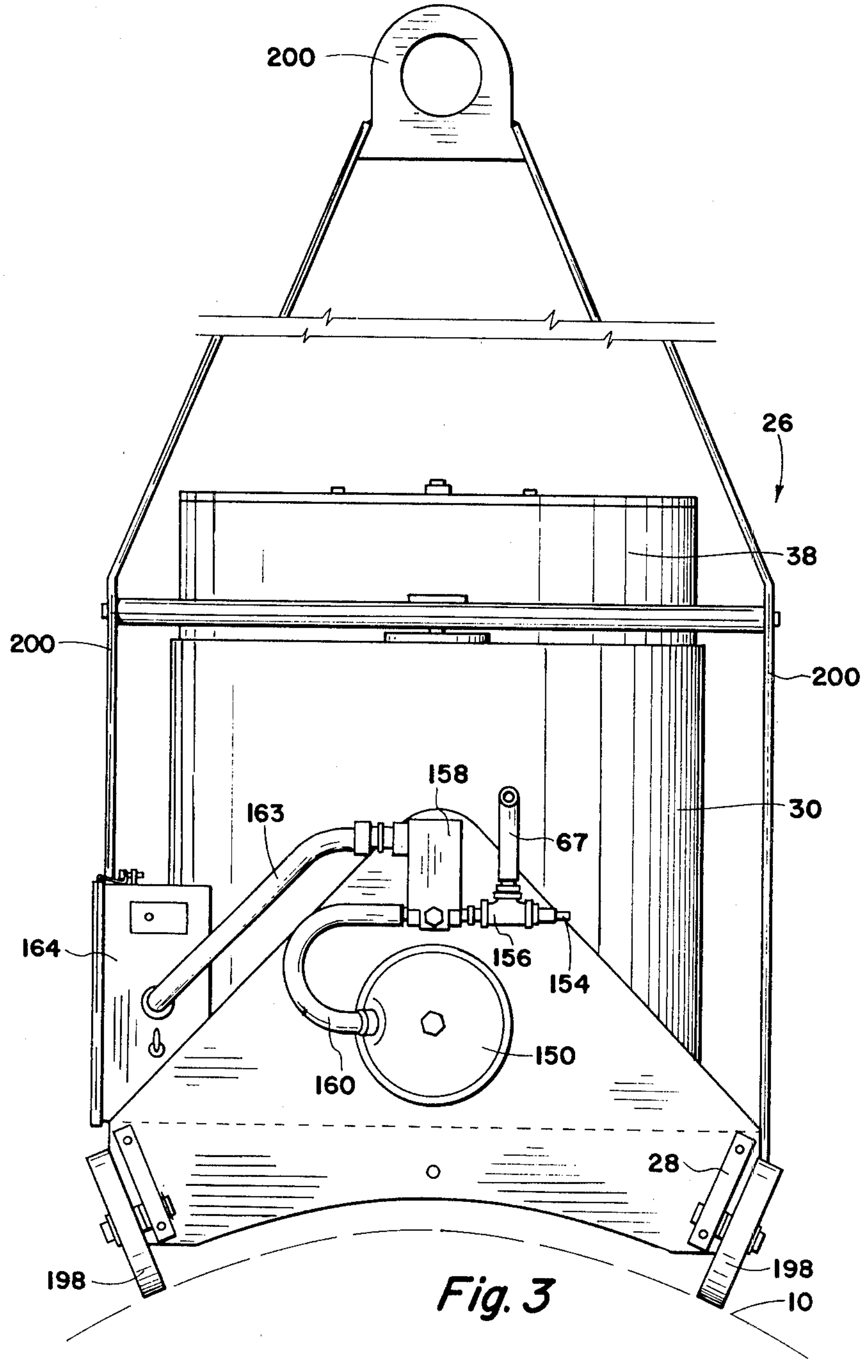
FIG. 3 is a front elevational view of the fluidization assembly.
Figure 4:
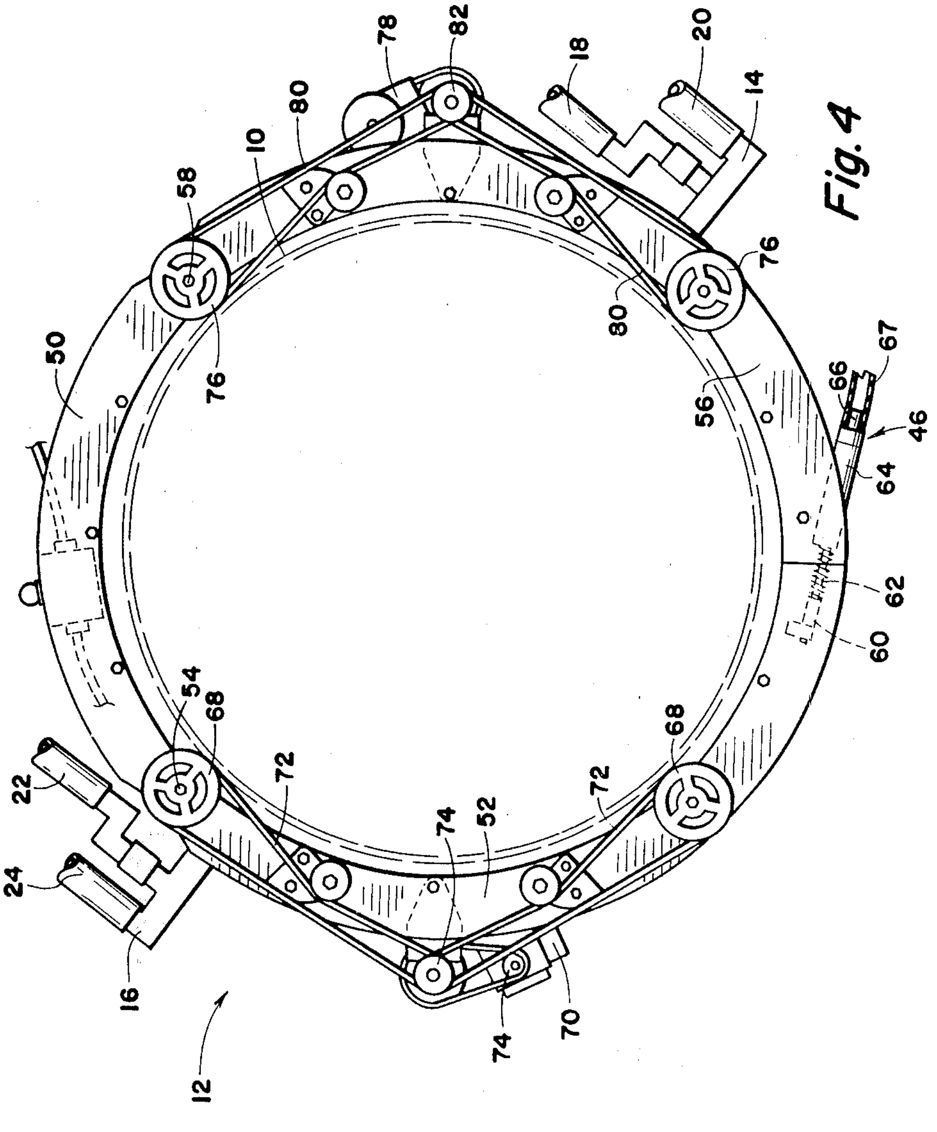
FIG. 4 is a front elevational view of a powder applicator ring of the present invention.

Referring to the drawings in detail, FIGS. 3 and 4 show a pipe 10 which has been made up from pipe sections welded together in end-to-end relation. These pipe sections have been previously coated at the mill except for the ends, which, as indicated above, are welded together in the field. The basic purpose of the present invention is to provide a system for spraying fluidized powder which, for example, can be used for coating these weld joints (not shown). Since the apparatus of the present invention is providing a fluidized powder to the surface of the weld joint, the latter would have been previously heated by suitable heating means, such as an induction coil (not shown), to a sufficient temperature to cause the powder to melt and cure.

As shown in FIG. 4, the present invention is illustrated in combination with a powder applicator ring or yoke 12 (the details of which will be described hereinafter) capable of moving circumferentially about pipe 10. Applicator ring 12 has mounted thereon a pair of powder dispensers 14 and 16 which are connected by means of conduits or hoses 18 & 20 and 22 & 24 respectively, to a fluidization assembly 26, shown in FIGS. 1, 2, and 3. A fluidization assembly 26 (the details of which will hereinafter be disclosed) is mounted on a vehicle or carriage 28 which is capable of moving along the pipe 10.

The fluidization assembly 26, which is the essence of this invention, includes a fluidization chamber 30, and a pair of powder control valves 32 and 34 (see also FIG. 5), and an auxilliary (for the purposes of this disclosure only) actuator assembly 36 and a powder recovery canister 38 (all of which will be described in detail hereinafter). The fluidization assembly is also provided with a fluidization blower 40 and two powder blowers 42 and 44 (which will be disclosed in further detail) and an air compressor (not shown). The air supply from the compressor is used to actuate powder control valves 32 and 34 and a pneumatic latching cylinder 46 (see FIG. 4) on applicator ring 12. The moist compressed air does not come in contact with any powder.

The applicator ring 12, for circling the pipe, is similar to the apparatus disclosed in U.S. Pat. No. 4,005,677 issued on Feb. 10, 1977 and entitled "Apparatus for Circumnavigating a Dispenser About a Pipe or the Like". The applicator ring includes a central arcuate frame member or section 50 (similarly formed by a pair of spaced members not shown) pivotally connected to a first side frame member or section 52 by means of a rod 54 (which also constitutes an axle for a pair of wheels 68). The ring also includes a second side frame member or section 56 which is hingedly or pivotally connected to a central frame member 50 by means of a rod 58 (which also serves as an axle for supporting a pair of wheels 76). The adjacent ends of side frame members 52 and 56 are latched together at the bottom of the ring by means of pneumatic latching cylinder 46. Latching cylinder 46 comprises a rod end coupler 60, a latching spring 62 (which surrounds a rod not described), an air cylinder 64 and a hose connection 66. The latching cylinder is provided with a suitable hose 67 (see FIG. 3) which is connected to the air supply from the compressor (in a manner to be disclosed hereinafter). Latching cylinder 46 is maintained at a predetermined latching pressure while still allowing the ring to flex around a pipe which might be considerably out of round.

As shown in FIG. 4, first side frame member 52 is provided with a set of drive wheels 68 which are powdered by a motor 70 via conventional means, such as drive belts 72 and pulleys 74. Second side frame member 56 is similarly provided with a set of drive wheels 76 which are powered by a motor 78 via conventional means, such as drive belts 80 and pulleys 82. Motors 70 and 78 are reversible thereby allowing applicator ring 12 to circumnavigate the pipe 10 in either rotary direction.

Returning to a further consideration of FIGS. 1 and 2, the fluidization chamber 30 provides a supply of fluidized powder to the powder dispensers in a manner to be disclosed hereinafter. The fluidization chamber is a hollow sealed cylinder approximately 18 inches in diameter and having an approximate depth or height of 16 inches. The chamber is provided with an expanding rubber plug 90 in the center of its top or lid 92. Rubber plug 90 comprises a locking screw 94, a top flange 96 and a rubber seal 98. The plug is removed to pour powder into the chamber.

Chamber 30 is also provided with a porous plastic (polyethylene) screen or fluidization membrane 100 near its bottom. Screen 100 is inserted into a screen retainer 102 in much the same manner as a gasket and is parallel to a bottom plate 104 of the chamber 30. Bottom plate 104 is mounted on the carriage by means by three screws 106. The porous screen is supported by a plurality of transverse rods (not shown) which are disposed across the chamber thus preventing the screen from collapsing onto the bottom plate.

The screen divides the chamber into a top section 108 and a bottom section 110. The rubber plug is removed and the fluidization chamber is filled with a quantity of powder (not shown) to reach within 8 inches from the top of the chamber. The rubber plug is replaced, thus creating an air-tight structure out of the chamber. The powder rests on top of the screen and is aerated or fluidized by the passage of air through the porous screen 100.

The flow characteristics of the fluidized powder resemble those of common liquids. The chamber is provided with a hose 112 attached to a suitable hose connection 114 near bottom plate 104. As shown in FIG. 1, the hose is connected to an adaptor 116 on fluidization blower 40, which is the source of the fluidizing air. Fluidization blower 40 is a vacuum-type blower, whose exhaust is injected into bottom section 110 of the chamber by means of hose 112. The blower 40 is mounted on the rear of the recovery canister 38 and has its suction or intake from the atmosphere.

The low pressure air, from the blower, bubbles up through the powder causing it to fluidize in top section 108 of the chamber 30. The air is trapped in the chamber above the powder, subsequently building up a pressure between 2 to 3 p.s.i. The chamber 30 is provided with a pair of internal fixed orifices 118 mounted on the lid 92 and constituting inlets for a pair of metering hoses 120 (only one of which is shown) connected to a forward portion of the powder valves 32 and 34. As will hereinafter appear, the fixed orifices 118 provide a kind of pressure relief for the chamber.

Figure 5:
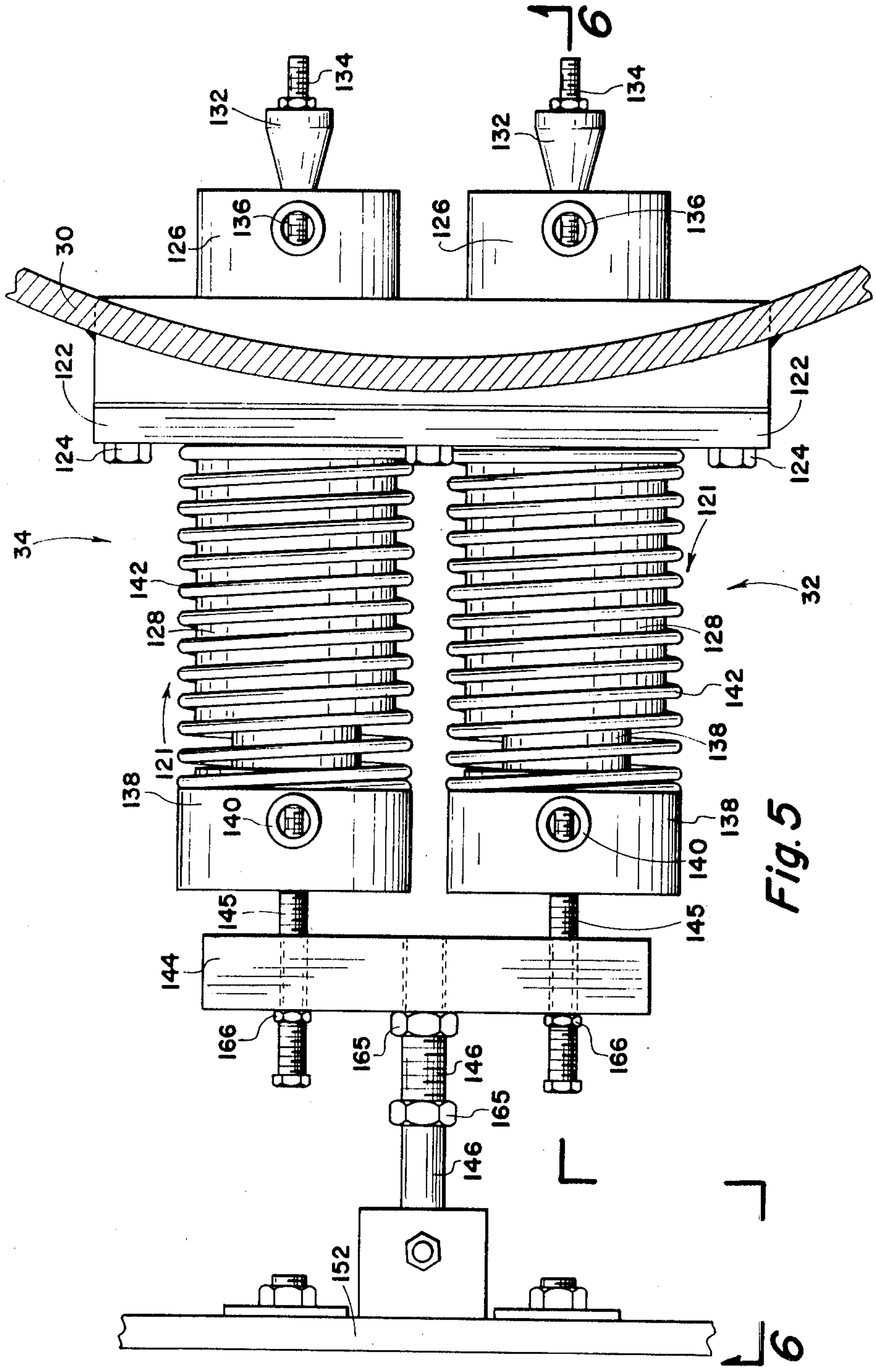
FIG. 5 is an enlarged top plan view showing in greater detail the powder control valves of the present invention.
Figure 6:
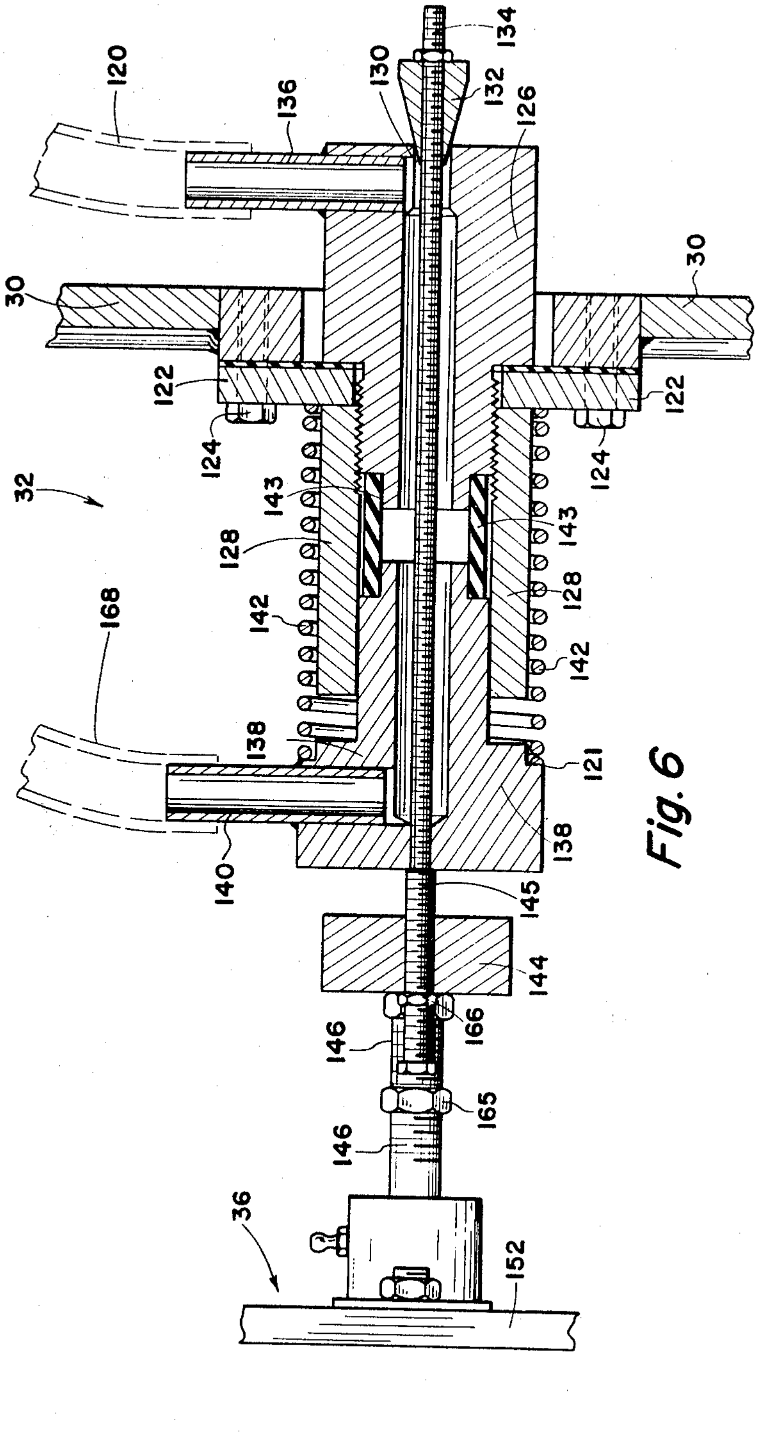
FIG. 6 is a cross-sectional view taken along section line 6—6 of FIG. 5, showing a powder control valve in the closed position.
Figure 7:
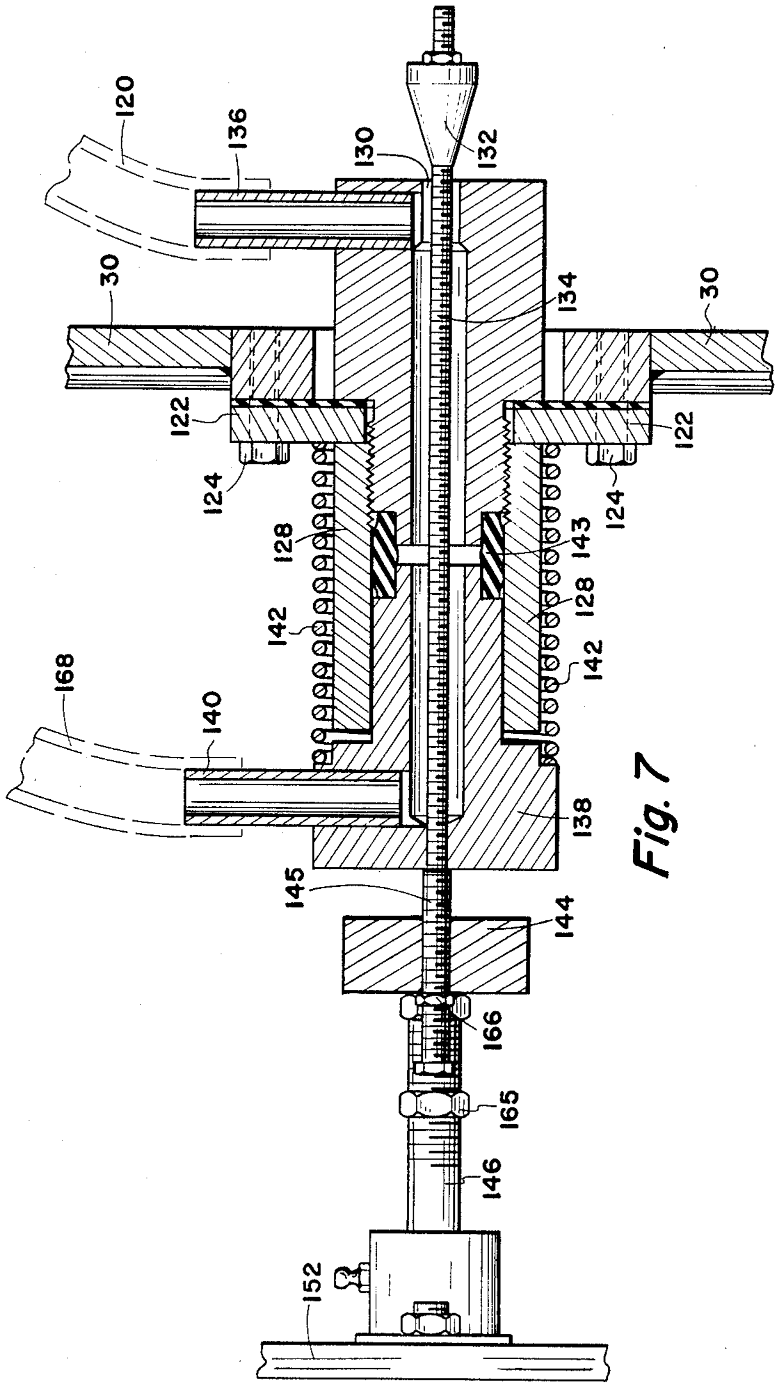
FIG. 7 shows the powder control valve of FIG. 6 in an open position.

Referring to FIGS. 5, 6 and 7, each of the powder control valves 32 and 34 comprises a powder valve body 121 mounted on a powder valve mount 122 which is affixed to the front of chamber 30 by means of bolts 124. Powder valve body 121 is horizontally disposed and partially extends inside the chamber directly above the porous screen. The powder valve body includes a fixed valve seat 126, internal of the chamber, which is threadly received into a valve cylinder 128 (as best shown in FIGS. 6 and 7). Valve seat 126 is provided with an adjustable orifice 130 which extends through the valve body as shown. The tapered end of a cone-shaped poppet 132 is received within adjustable orifice 130 at the rear of the valve seat. Poppet 132 is centrally mounted on a horizontally disposed piston rod 134, which runs coaxial with the orifice 130 through the powder valve body and whose purpose will be disclosed hereinafter.

The valve seat 126 is also provided with an orifice tubing 136 on its upper side near the poppet which is in communication with the adjustable orifice. Orifice tubing 136 provides a hose connection for metering hoses 120 from the fixed orifices 118 attached to the top of the chamber. The pressurized air in the chamber 30 is metered through the fixed orifices into the powder control valves. The metered flow of air regulates the amount of fluidizing air coming into the chamber since the fluidization blower 40 is constantly exhausting air into the chamber throughout the operation. The exhausting (or bleeding off) of the air through orifices 118 keeps the metering hoses and various tubing clean when the powder valves are in a closed position (see FIG. 6).

The powder control valves also include a piston 138 which threadly engages the end of piston rod 134. Piston 138 is slidably received within a portion of cylinder 128 and is also provided with a delivery tubing 140 (the purpose of which will be disclosed hereinafter). The cylinder 128 and piston 138 are surrounded by a compression spring 142. The interiors of the powder control valves are each provided with collapsible seals 143.

As shown, the poppet 132 is received on the piston rod which is threaded into the piston 138. A piston cross bar 144 is provided with two actuator bolts 145 which extend through cross bar 144 and whose forward ends contact the pistons 138. An actuating rod 146 extending from the actuator assembly 36 is threadly received in cross bar 144 between the extending ends of the actuator bolts 145. Actuating rod 146 is extended by means of a pneumatic pressure provided by the air compressor (not shown) in a manner to be disclosed hereinafter.

Referring to FIGS. 1, 2, 5, 6 and 7, actuating rod 146 is extended towards the right by means of a diaphragm (not shown) which bears against the left hand end of the rod 146 and which is located within an air brake bisquet 150. Air brake bisquet 150 is mounted on a front plate 152 of the carriage 28. The air supply for the air brake comes from the air compressor. The compressed air is fed into a line 154, which is subsequently fed into a Tee 156 (see FIG. 3) which splits the compressed air off in two directions. A portion of the air is sent to the latching cylinder on the applicator ring 12 via line 67. The remaining portion of the air is sent to an air solenoid valve 158 which subsequently discharges the air into an air brake feed line 160 which feeds into the brake 150 on the back or left hand side of the aforementioned diaphram. The air solenoid valve 158 is controlled by an operator's control box 162 via a junction box 164 which is interconnected by means of an electrical conduit 163.

As shown in FIG. 7, when the air solenoid valve 158 is activated, an air pressure is fed into the air brake 150. The diaphragm within the air brake flexes toward the right and thus exerts a pressure against actuating rod 146 causing it to be urged to the right. When the actuating rod is thus extended, the cross bar 144 is urged to the right while simultaneously translating its motion to the actuator bolts 145, thus urging the bolts 145 to the right. The ends of the bolts press against the pistons 138, which are pushed forward or rightward further into the cylinder 128. The above action compress springs 142 while unseating poppets 132 from the adjustable orifices 130 in the valve seat, as shown.

As the poppets are unseated, the pressure of the air above the fluidized powder forces the powder out of the chamber, through orifices 130 between the powder valve body and the poppet, and into the delivery tubing 140. The size of the orifices 130, and therefore the amount of fluidized powder discharged into the orifices, can be regulated by collectively or individually lengthening or shortening the amount of travel in the actuator bolts 145. This is accomplished by manually adjusting nut 165 on the actuating rod 146 for collective adjustment and/or two locking nuts 166 on the left-hand ends of the actuator bolts 145 for individual adjustment. The fluidized powder, which has been discharged through the powder valve body, is injected from the delivery tubing 140 and into connected delivery lines or hoses; wherein a delivery line 168 is from powder control valve 32 and a delivery line 170 is from powder control valve 34.

The fluidized powder streams in delivery lines 168 and 170 are fed into conduits 18 and 22, respectively (see FIG. 1), each of which contains an air stream which delivers the fluidized powder to the powder dispensers 14 and 16, respectively, on the applicator ring 12. The source of the above air streams in conduits 18 and 22 is the exhaust from the two powder blowers 42 and 44, respectively, which are mounted on opposite sides of the recovery canister 38.

The greater details of the powder dispensers 14 and 16 are not shown in the drawings. The powder dispensers are substantially the same as the powder dispensers disclosed in prior U.S. Patent No. 4,038,942 as illustrated in FIGS. 4 and 5 thereof and as the powder dispensers disclosed in U.S. Pat. No. 4,237,817, as illustrated in FIGS. 3 and 4 thereof. Each powder dispenser, 14 and 16, has an inner housing (not shown) which is connected to conduits 18 and 22, respectively; and has an outer housing (not shown) forming a space therebetween. Both of the dispenser housings have openings adjacent the surface of the pipe 10. The outer housings are connected to the return conduits 20 and 24 which, in turn, are connected to a pair of tangential inlet pipes 172 and 174, respectively, on the recovery canister 38.

Figure 1:
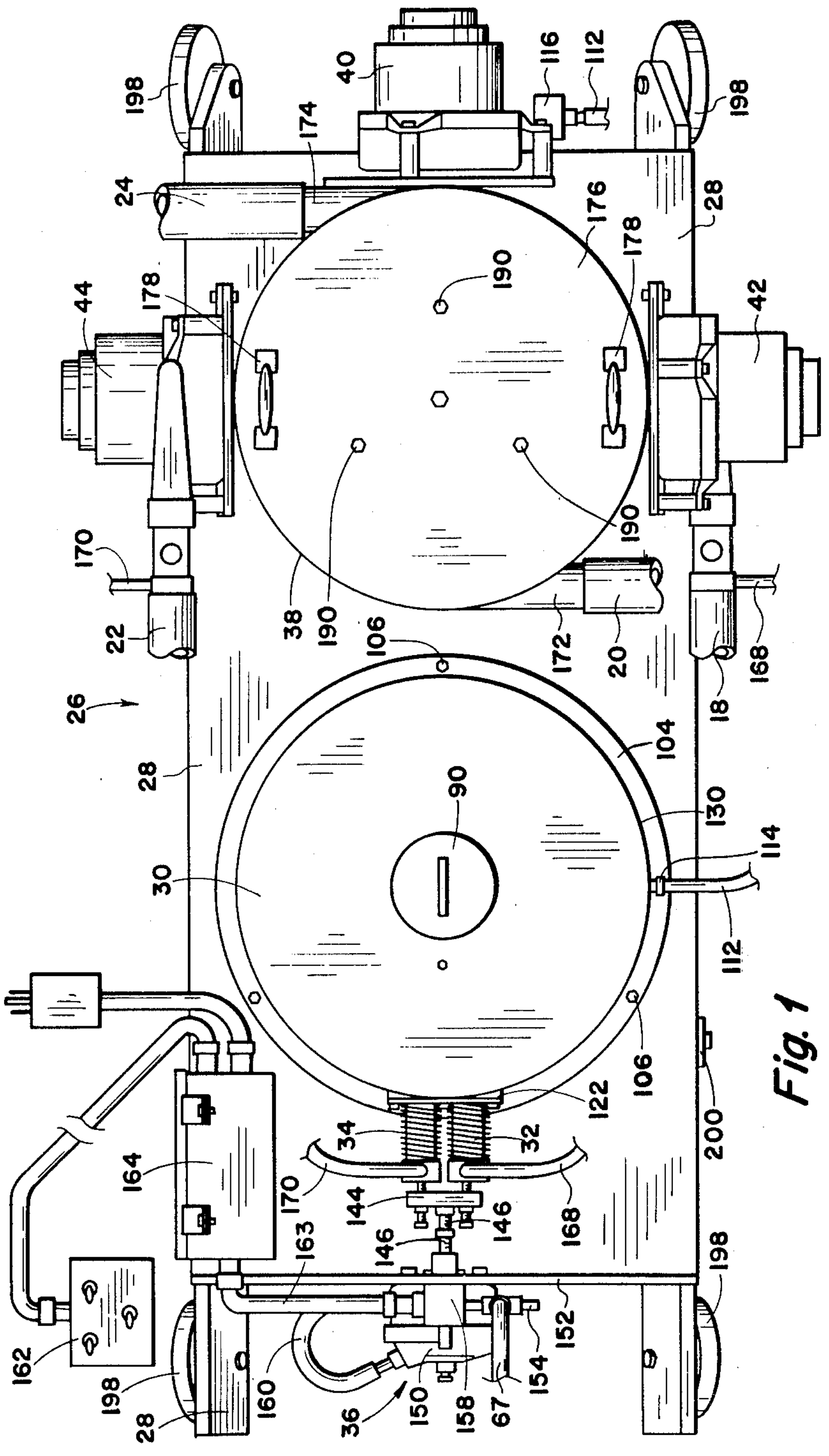
FIG. 1 is a top plan view of the fluidization assembly of the present invention mounted on a movable carriage.
Figure 2:
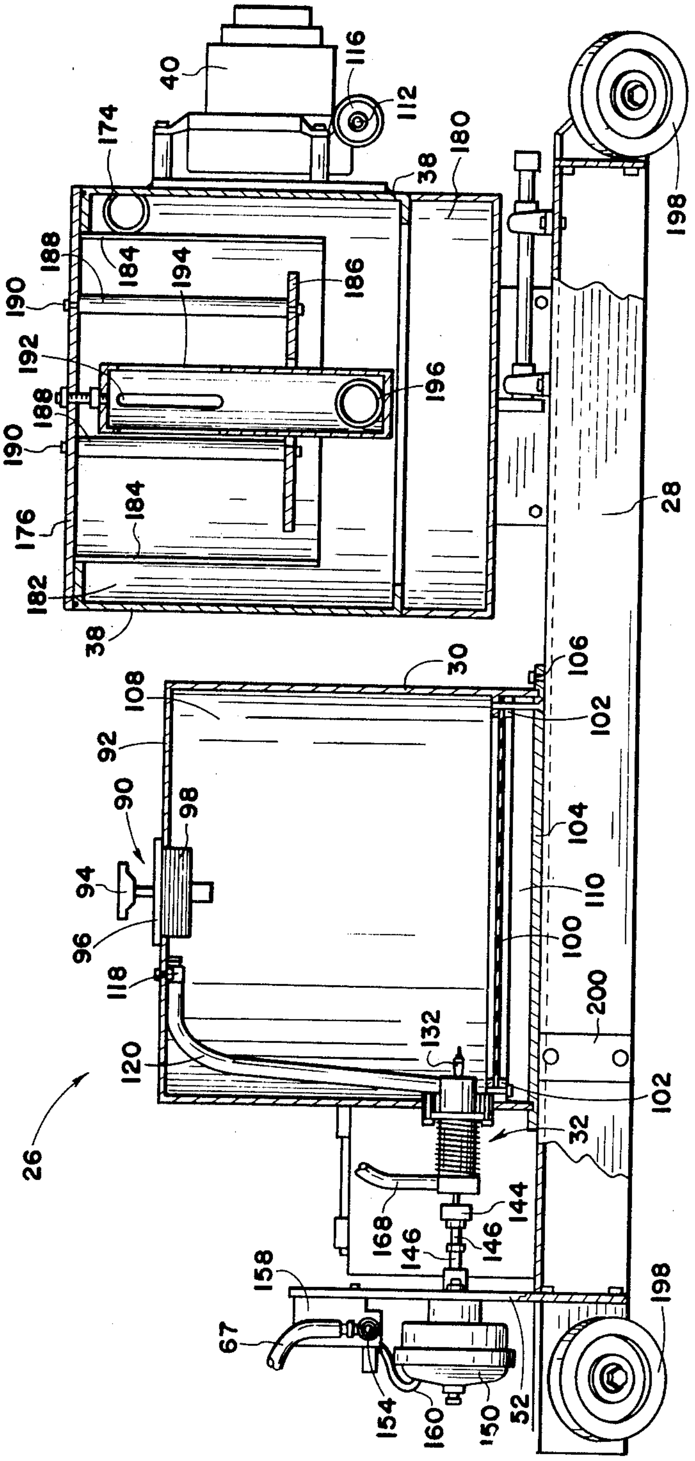
FIG. 2 is a side sectional view of FIG. 1.

Returning to a further consideration of FIGS. 1 and 2, the two tangential inlet pipes 172 and 174 enter the recovery canister 38 near its top or lid 176. Lid 176 is provided with two handles 178 for easy removal thus allowing access to the inside of the canister. The suction ports (not shown) of powder blowers 42 and 44 are in limited communication with the inside of the recovery canister, which causes the pressure within canister 38 to be drawn down below atmospheric. The air streams within return conduits 20 and 24, containing the recovered fluidized powder from pipe 10, flow into tangential inlet pipes 172 and 174, respectively. The above air flow effects a cyclone-type separation of the powder particles from the above air streams within the canister. The reclaimed powder particles are deposited on a removable recovery pan 180 at the bottom of the canister.

The aforementioned cyclone-type separation is accomplished by means of spiralling the air streams downwardly within an annular space 182 inside the recovery canister. Annular space 182 is generated by an internal cylinder 184 which is open at its bottom. The flow of the air streams coming in from the tangential inlet pipes is further channelled by means of a baffle plate 186 mounted on the lower ends of a plurality of spacer bars 188. The upper ends of space bars 188 are affixed to the lid 176 by means of screws 190

The above channelled air streams, containing a few light powder particles, flow into four vertical slots 192 (only one of which is shown) in a central vertical pipe 194 in the recovery canister. Central vertical pipe 194 is connected to the center of a horizontal pipe 196 which is subsequently connected at its ends to the suction ports (not shown) or intake of the powder blowers 42 and 44. The air entering the four vertical slots 192 flows down the central vertical pipe and into the intake of the powder blowers. The above air is used again in the air streams of conduits 18 and 22, which convey the fluidized powder to the dispensers.

In order for the carriage 28 to move along the pipe, it is provided with a plurality of wheels 198 which are angularly attached to the carriage as best shown in FIG. 3. Carriage 28 is also provided with a lifting eye assembly 200 affixed to the carriage adjacent the fluidized chamber 30.

Whereas the present invention has been described in particular relation to the drawings attached hereto, it should be understood that other and further modifications, apart from those shown or suggested herein, may be made with the spirit and scope of this invention. For example, the system for spraying fliudized powder has been illustrated and described in connection with a specific apparatus for coating weld joints on a pipe or pipeline; it should be obvious that the system of the present invention could be employed wherever it was desired to spray fluidized powder broadly.

What is claimed is:

1. An improved system for spraying fluidized powder comprising a powder dispenser, a powder fluidization chamber including a hollow container adapted to contain a quantity of powder therein, means for sealing said chamber, means for introducing a stream of air into said chamber to fluidize the powder therein, a powder blower having an outlet from which a stream of air is allowed to pass, a powder control valve connected to said chamber and in communication with said fluidized powder therein, means for actuating said powder control valve wherein a quantity of fluidized powder is exhausted into an orifice in said powder control valve, means for introducing the exhausted fluidized powder from said powder control valve into the side of said outlet from said powder blower, a supply conduit connecting said outlet with a portion of said powder dispenser for supplying a stream of fluidized powder to said powder dispensing device, and a fluidization blower having its suction from the atmosphere and from which a stream of fluidizing air is allowed to pass into said chamber, said powder control valve comprising a powder valve body partially extending into said chamber, said powder valve body having a fixed valve seat internal of said chamber and being threadly received within a cylinder, said cylinder being external of said chamber and having a piston slidably received therein, a compression spring surrounding said cylinder and said piston, a cone-shaped poppet having its tapered end received into an orifice within said valve seat, and a horizontally disposed piston rod received on said poppet and extending through said powder valve body and being threadly received in said piston whereby said piston rod is adapted to extend into said chamber when the spring is compressed, thus unseating said poppet from the valve seat orifice thereby allowing a quantity of fluidized powder to be exhausted into the powder valve.

2. An improved system as set forth in claim 1 wherein said means for introducing a stream of air into said chamber comprises a hose connected to said chamber adjacent its bottom into which fluidizing air is allowed to pass, and wherein said chamber is provided with support means mounted in said chamber at a location above said hose so as to support a horizontally disposed porous screen upon which a quantity of powder rests.

* * * * *